Dec. 30, 1924.
H. A. STEELE
TOOL JOINT
Filed Feb. 5, 1924
1,521,482
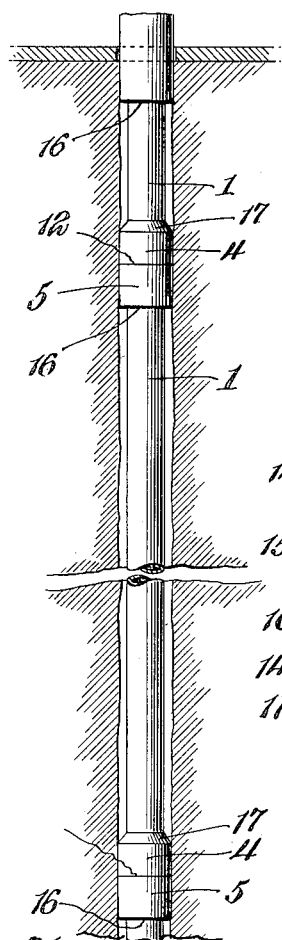
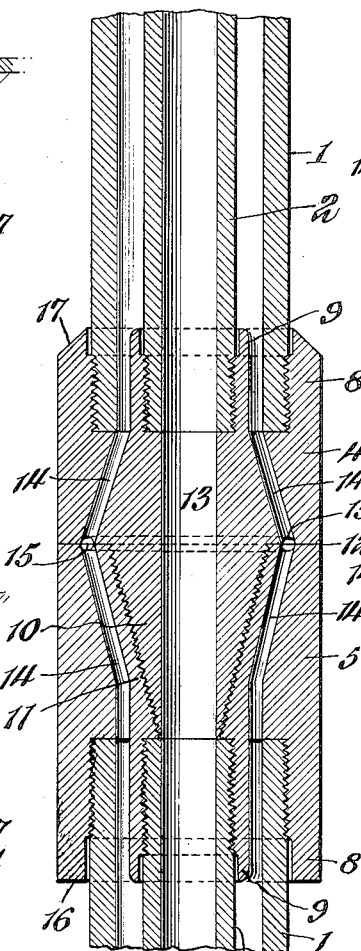
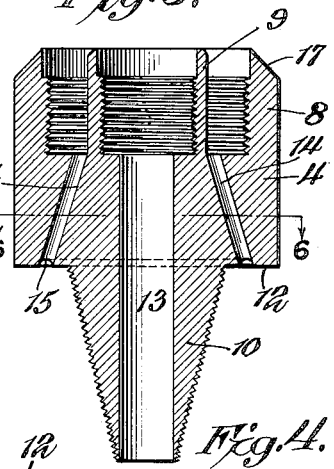
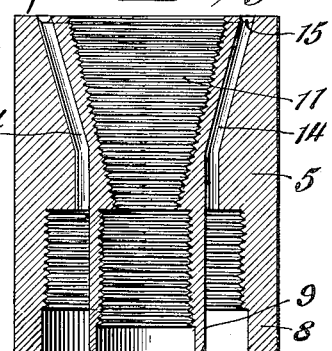
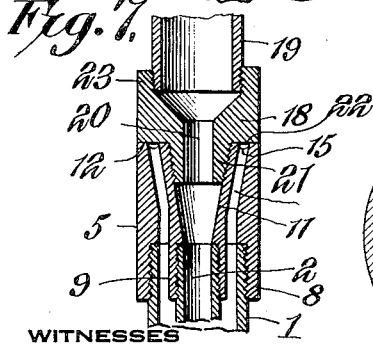
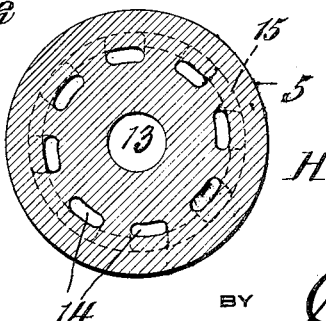
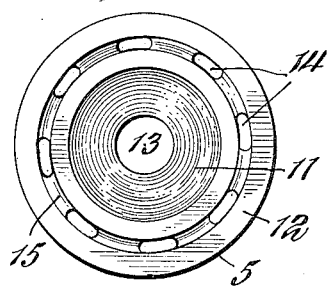
Hampton A. Steele,
INVENTOR,
BY
ATTORNEY Patented Dec. 30, 1924.

1,521,482

UNITED STATES PATENT OFFICE.

HAMPTON A. STEELE, OF LAWTON, OKLAHOMA.

TOOL JOINT.

Application filed February 5, 1924. Serial No. 690,805.

*To all whom it may concern:*

Be it known that I, HAMPTON A. STEELE, a citizen of the United States, residing at Lawton, in the county of Comanche and State of Oklahoma, have invented a new and useful Tool Joint, of which the following is a specification.

This invention relates to tool joints, which are especially adapted for use in connecting the sections of pipe used in deep well operations, such as are described in my companion applications, Serial Numbers 690,806 and 690,807, filed of even date herewith.

In carrying on operations according to the methods described in the above mentioned applications, it is particularly desirable to use a duplex string of pipe, in which several sections are connected together at each joint in a manner to provide free circulation through both the inner and outer pipes. The general object of the present invention, therefore, is to provide a joint for connecting the adjacent ends of sections of concentric inner and outer pipes, without materially obstructing the flow of liquid therethrough. For this purpose, I have provided a joint made up of mating sections, which when assembled leave a central bore in alinement with and substantially of the same diameter as the inner pipe. These sections are also provided with annular series of passageways, which are adapted to aline with the passageways between the inner and outer pipes, and which provide continuous passageways through the two sections of the joint regardless of the relative position of these sections.

In the drilling operation, the several sections of the duplex string of pipe are connected by these improved joints, and the upper section of the string of pipe is connected by a similar joint to a grief joint having a stem with inner and outer passageways to correspond with the concentric sections of the pipe string. During the drilling operation water is introduced under pressure through the outer pipe, and a return flow is obtained through the inner pipe. Under certain circumstances, however, it is desirable to use the pipe line in the same manner as a single pipe, and I have, therefore, provided a joint section, which is interchangeable with the upper section of the uppermost tool joint, and which is provided with means for shutting off the flow through the outer pipe, and is provided with a bore adapted to aline with the inner pipe and to be connected to the ordinary grief joint having a single passageway.

The details of construction of my invention and the advantages thereof will be best understood from the following detailed description taken in connection with the accompanying drawing, which illustrates the preferred form of the invention.

In the drawing:

Figure 1 is a side elevation of a string of pipe as it appears in operation, with my improved tool joint used for connecting the several sections.

Figure 2 is a diametric section through one of the tool joints and the ends of the adjacent sections of pipe.

Figure 3 is a diametric section through the male member of my improved tool joint.

Figure 4 is a similar section through the female member of the joint.

Figure 5 is a plan view of the member shown in Figure 4.

Figure 6 is a horizontal section taken on the line 6—6 of Figure 3.

Figure 7 is a diametric section showing the adaptation of the tool joint for use with a grief joint having a single passageway.

The invention is shown in connection with a duplex pipe line having outer and inner concentric pipe sections 1 and 2, connected end to end by tool joints constructed according to the present invention, and each comprising a male member 4 and a female member 5. The outer end of each of these members is provided with internally threaded concentric flanges 8 and 9, which engage the adjacent threaded ends of the next sections of duplex pipe line. The members 4 and 5 have mating tapered portions 10 and 11 provided with interengaging tapered threads and interengaging shoulders 12, which lie in a plane perpendicular to the axis of the joint. The member 4 is provided with a central bore 13, which is adapted to aline with the bores of the inner pipe sections, so as to form a straight continuous passageway. Each of the sections 4 and 5 is also provided with an annular series of passageways 14, which are adapted to aline with the space between the flange 9 and the end of the outer pipe section 1. These passageways 14 are arcuate in cross section, as shown in Figures 5 and 6, and have a combined area equal to substantially half of the area of the annular space between the flange 9 and the outer pipe section. The adjacent ends of the passageways 14 are flared outwardly and terminate in a continuous annular groove 15 formed in the face of the shoulder 12, so that there is a continuous passageway, substantially unobstructed, between the inner and outer pipe sections throughout the entire length of pipe. It will be understood that the pipe sections 1 and 2 of each length of duplex pipe are cut to the same lengths, so as to fit when joined together. The lower member 5 of the joint, preferably terminates at its lower end in an annular shoulder 16, the plane of which is perpendicular to the axis of the pipe, so as to provide an abutment for the tools when supporting or raising the pipe from the well, while the outer member 4 terminates at its upper end in an inclined shoulder 17, so that it will readily slip past any protuberance from the side of the well when the pipe is being withdrawn.

The joint constituted by the members 4 and 5 may be used in connection with duplex pipe used in deep well drilling operations, and may also be used with a duplex string of well casing and packers as described in my companion applications above referred to. Whenever the joint is used in connection with well operations of such a character that a downward and a return flow are to be used, I connect to the member 4 of the uppermost joint a specially constructed duplex pipe section having an outer and inner casing to correspond to the pipe sections 1 and 2.

It will often occur, however, in connection with these operations that the operator desires to use a fish tail bit or to mud up the hole by fluid introduced through the central pipe. In order to provide for such use, I have provided another male member 18, which is to be used interchangeably with the member 4 of the uppermost joint, and which will be connected to an ordinary grief joint having a single stem, as indicated at 19, in Figure 7. This member 18 has a central bore 20 adapted to aline with the bore through the central pipe, and has a tapered threaded end 21 adapted to engage in the corresponding tapered portion 11 of the member 5. The remaining portion of the member 18 is solid, and has an annular shoulder 22 adapted to engage the corresponding shoulder 12 of the member 5, and to close the passageways between the inner and outer pipe. This member 18 is provided at its upper end with a single internally threaded flange 23, adapted to be engaged with the grief stem 19.

While I have shown and described the specific construction of one form in which the invention may be embodied, it is obvious that the same is capable of various modifications within the scope of what is claimed without departing from the salient features of the invention.

What is claimed is:

1. A tool joint, comprising two members with mating threaded portions, the outer end of each member having two concentric flanges internally threaded for receiving the ends of two concentric pipe sections, said joint when assembled having a central bore, and an annular series of passageways forming communication, respectively between the inner pipe sections and between the spaces separating the inner and outer pipe sections.

2. A tool joint, comprising two members with mating threaded tapered portions and abutting annular shoulders, the outer end of each member having two concentric flanges internally threaded for receiving the ends of two concentric pipe sections, said joint when assembled having a central bore forming with the inner pipe sections a continuous passageway, and each member having an annular series of passageways communicating with the space between the adjoining inner and outer pipe sections and terminating in an annular groove in said shoulder, which registers with the corresponding groove in the shoulder of the other member so as to form a continuous passageway through the outer pipe regardless of the relative circumferential position of the two members.

3. A tool joint, comprising two members with mating threaded tapered portions and abutting annular shoulders at the bases of said tapered portions, the outer end of each member having two concentric flanges internally threaded for receiving the ends of two concentric pipe sections, said joint when assembled having a central bore in alinement with the respective inner pipe sections, and each member having an annular series of passageways leading from the space between the adjoining inner and outer pipe sections and diverging toward the shoulder and terminating in an annular groove in the face of said shoulder which registers with the corresponding groove in the shoulder of the other member, so as to form a continuous passageway through the outer pipe regardless of the relative circumferential position of the two members.

In testimony, that I claim the foregoing as my own, I have hereto affixed my signature.

HAMPTON A. STEELE.